United States Patent Office 3,068,258
Patented Dec. 11, 1962

3,068,258
PROCESS FOR PRODUCING ARENE HYDROCARBON-TRANSITION METAL COMPOUNDS
Roy L. Pruett, Charleston, W. Va., and Donald R. Rink, Buffalo, and Leo Parts, Snyder, N.Y., assignors to Union Carbide Corporation, a corporation of New York
No Drawing. Filed Sept. 22, 1958, Ser. No. 762,267
14 Claims. (Cl. 260—429)

This invention relates to a process for producing organo-metallic compounds. More particularly, the invention relates to the use of alkali metal adducts of arene hydrocarbon compounds in the production of organo-metallic compounds containing at least one arene hydrocarbon group.

Organo-metallic compounds containing two arene hydrocarbon groups and a process for their production are disclosed in several published articles by E. O. Fischer and coworkers. See, for example, Z. Naturforschung 10b, 665 (1955); Z. Anorg. Allgem. Chem. 286, 142 (1956); Ber. 89 1805 (1956); and Ber. 89 1809 (1956). Examples of such compounds are bis(diphenyl)chromium, bis(mesitylene) molybdenum and bis(toluene) vanadium. Organo-metallic compounds containing only one arene hydrocarbon group have also been described. See, for example, Coffield et al., J. Am. Chem. Soc., 79, 5826 (1957). Examples of such monoarene compounds are methylcyclopentadienyl manganese benzene and cyclopentadienyl manganese diphenyl.

The existence of alkali metal adducts of certain arene hydrocarbons has been known for some time. See, for example, Scott, U.S. Patent 2,027,000, January 7, 1936; Scott et al., J. Am. Chem. Soc., 58, 2442 (1936); and Lipkin et al., Science, 117, 534 (1953). All of these alkali metal adducts are relatively unstable and are extremely sensitive to decomposition by air and moisture.

We have now discovered that the alkali metal addition complexes of arene hydrocarbons may be used in the production of organo-metallic compounds containing at least one arene organic group. According to this discovery, an alkali metal addition complex of an arene hydrocarbon is prepared in one of the operable solvents or solvent mixtures listed hereinbelow and is then reacted with an anhydrous transition metal halide-containing compound. An example of the process of this invention is the reaction of the sodium adduct of diphenyl with anhydrous chromium trichloride to give bis(diphenyl) chromium. Another example is the reaction of the sodium adduct of diphenyl with cylopentadienyl manganese chloride to give cyclopentadienyl manganese diphenyl. Still further examples are the reaction of the sodium adduct of diphenyl with molybdenum pentachloride to give bis(diphenyl) molybdenum and with vanadium trichloride to give bis(diphenyl) vanadium.

To be useful in the present invention, the arene organic compounds must (1) be capable of forming monoarene- or bis-arene-metal compounds and (2) form alkali metal addition complexes. The class of arene compounds which satisfies these two requirements may be represented by the formula

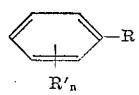

In the above formula R may be phenyl or alkyl-substituted phenyl, R′ may be alkyl, phenyl, alkylphenyl or phenylalkyl and $n$ has the values 0, 1, 2, 3, 4 and 5. Included in this generic structural formula are diphenyl and terphenyl and alkyl derivatives thereof. Organic hydrocarbons which are excluded are those containing fused ring systems and diaryl aliphatic hydrocarbons such as diphenylmethane. Thus the essential characteristic of the compounds represented by the generic structural formula is that they contain an unfused benzene nucleus bonded to a second benzene nucleus by a single carbon to carbon bond. Examples of the compounds represented by the above formula are diphenyl, p,p′-diethyl diphenyl, terphenyl, and 2,4-dimethyldiphenyl.

Examples of the transition metal halide-containing compounds which are operable in the present invention are the cyclopentadienyl halides of transition elements of group VII–B in the periodic classification of the chemical elements such as methylcyclopentadienyl manganese bromide and cyclopentadienyl rhenium dichloride and the halides of transition elements of groups V–B and VI–B in the periodic classification of the chemical elements such as vanadium tribromide, niobium pentachloride, tantalum pentachloride, chromium trichloride, molybdenum pentachloride and tungsten hexachloride.

In general, the alkali metal adducts of this invention are addition complexes of lithium, sodium and potassium with diphenyl and terphenyl and their alkyl derivatives, and such alkali metal adducts may be prepared in a relatively restricted class of solvents. Operable solvents are ethers having not more than about four carbon atoms per oxygen atom in the ether molecule. If the ether is non-cyclic aliphatic it should contain a methoxy group. Examples of operable solvents are dimethyl ether, methyl ethyl ether, and dioxane. Ethylene glycol dimethyl ether and tetrahydrofuran are the solvents most preferred. Mixtures of the above ether solvents are also operable as are mixtures of these ether solvents with inert hydrocarbons such as xylene or kerosene.

The exact structure of the alkali metal adducts has not been completely established. However, the stoichiometry of the reaction for their formation requires one mole of alkali metal per mole of arene hydrocarbon, and for the purposes of describing this invention it will be assumed that one alkali metal atom is associated with each arene hydrocarbon molecule.

According to the present invention, the alkali metal adduct of the arene hydrocarbon may be prepared by reacting a solution of the arene compound in one of the operable solvents or solvent mixtures listed hereinabove with the alkali metal, care being exercised to exclude air and moisture. This may be conveniently done by carrying out the reaction under an atmosphere of nitrogen, argon or other inert gas. This step in the process is preferably carried out at a temperature between about −10° C. and 25° C., although higher or lower temperatures are operable. It is also preferable to stir the resulting reaction mixture for at least one hour to insure complete reaction of the alkali metal with the arene hydrocarbon. The amount of solvent is not critical but it is best to use at least three parts by weight of solvent per part of arene hydrocarbon.

U.S. Patent 2,027,000 describes in detail the preparation of lithium, sodium and potassium adducts of arene hydrocarbon compounds. We have found that in preparing the sodium adducts it is preferable to employ a dispersion of sodium in an inert hydrocarbon solvent. A dispersion of sodium in an inert liquid hydrocarbon, such as xylene, kerosene or mineral oil, may be prepared by agitating the molten metal in the hydrocarbon at temperatures above its melting point until a uniform dispersion is obtained. Preferably, the dispersion should contain about 40–50 weight percent sodium. The dispersion is then cooled to room temperature and slowly added to a solution of arene hydrocarbon in one of the operable solvents or solvent mixtures. Specific examples of preparing such adducts are given hereinbelow.

In the preferred form of the invention the metal chlorides or cyclopentadienyl metal chlorides are used because they are relatively inexpensive, although the corresponding bromides and iodides may be used if desired.

The cyclopentadienyl metal halides including alkyl-substituted cyclopentadienyl metal halides may be prepared by reacting an anhydrous group VII-B transition metal halide with an alkali metal cylopentadienide, preferably sodium cyclopentadienide, in an inert organic ether solvent. The preparation of sodium cyclopentadienide is described in detail in Weinmayr, U.S. Patent 2,777,887, January 15, 1957. The alkali metal cyclopentadienide may be added to a suspension of the metal halide in an ether solvent slowly, with stirring, and in the absence of air and moisture. This reaction may conveniently be carried out at room temperature and will be essentially complete within about 15 minutes after all of the alkali metal cyclopentadienide has been added.

The anhydrous halides of the group V-B and group VI-B transition metals may be prepared by well known procedures such as those described in Sidgwick, N.V., The Chemical Elements and Their Compounds, vol. I and II, Oxford Univ. Press, 1950.

In carrying out the process of this invention, it is convenient to combine separate preparations of the alkali metal adduct of the arene hydrocarbon and of the transition metal halide-containing compound. A suspension of the metal halide compound may be prepared in an organic ether solvent which is inert to all products and reactants except for possible etherate formation with the metal halide-containing compounds. It is preferable to employ the same solvent used in the preparation of the alkali metal adduct, but other ethers such as diethyl acetal, dibutyl acetal and the dibutyl ethers of ethylene and diethylene glycol may also be used. Diethyl ether should not be used as a major constituent in the solvent as it tends to decompose the alkali metal adduct. The amount of solvent is not critical, but it is preferable to use a considerable excess. Next, a solution of alkali metal adduct may be added slowly, with stirring, to the suspension of metal halide or cyclopentadienyl metal halide. Again, care should be exercised to exclude air and moisture. After the addition is complete, the reaction mixture may be stirred for about one hour or longer.

The temperatures at which this reaction may be carried out vary over a considerable range of from —80° C. to 100° C. However, it is preferred to carry out the reaction at temperatures between about —20° C. and 40° C.

The time necessary to carry out the reaction may be varied over wide limits. The yields do not appear to be materially reduced by maintaining the reactants under the desired reaction conditions for extended periods of time. Generally, it is preferred to maintain the reactants at a temperature between about —20° C. and 40° C. for about 1 hour after the addition of all of the alkali metal adduct.

The best yields of products are obtained when stoichiometric, that is one mole of alkali metal adduct per mole of halogen in the metal halide-containing compound, amounts of reactants are used. However, the process is operable with non-stoichiometric reactant ratios. The preferred reactant ratios are described in more detail hereinbelow.

The reverse order of combining the reactants may also be used; that is, the transition metal halide-containing compounds may be added to the solution of alkali metal adduct. This mode of combining reactants is preferred when a solid anhydrous metal halide is to be added without previously forming an ether suspension of the halide. The conditions of temperature, reaction time and reagent ratios for this mode of addition are the same as described hereinabove.

The methods used to isolate the desired product from the reaction mixture depend upon the chemical nature of the product and no one general procedure can be given. However, several specific recovery procedures are described in examples hereinbelow.

An embodiment of the process of the present invention may be illustrated by the following detailed description of the preparation of bis(diphenyl) chromium.

A four-neck, 500-ml. creased flask was fitted with a reflux condenser protected with an argon stream, a mechanical stirrer, thermometer, and dropping funnel. In the flask were placed 150 milliliters of tetrahydrofuran and 46.0 grams (0.30 mole) of diphenyl. The mixture was cooled to 0° C. and 16 grams (0.30 mole) of a 43% sodium dispersion in xylene were added slowly from the dropping funnel. Cooling was necessary to maintain a temperature of less than 10° C. and a dark green color developed. After all the sodium had been added, the dark green mixture was stirred at 10° C. or below for one hour.

The dropping funnel was replaced with a flexible tubing connected to a 125 milliliter Erlenmeyer flask containing 15.9 grams (0.10 mole) of anhydrous chromium trichloride, and the $CrCl_3$ was added in portions, at or less than 20° C. Very little heat was evolved. The mixture was stirred at 20°±3° C. for 2.5 hours. During this time the mixture changed to a dark brown color. It was allowed to stand at room temperature overnight.

The dark mixture was stirred at room temperature for 5 hours, and the solvents removed at 35° C. under reduced pressure. Two hundred milliliters of benzene were added and the orange benzene solution was decanted under argon. Evaporation of this solution at 40° C. under reduced pressure gave an orange solid.

The bis(diphenyl) chromium in the orange solid was separated and identified in the following manner: The solid was mixed with 100 milliliters of n-heptane and 100 milliliters of water. The heptane layer was orange; the water layer colorless. Air was passed through the mixture, at room temperature, for 1 hour. During this time the aqueous layer become golden yellow-orange; the heptane layer faded. This shows oxidation of the neutral bis(diphenyl) chromium molecule to the water-soluble cation, bis(diphenyl) chromium hydroxide. The layers were separated and the aqueous layer was treated with excess solid potassium iodide. A milky precipitate, bis(diphenyl) chromium iodide, formed immediately. This was extracted with chloroform and isolated by evaporation of the chloroform solution. The bis(diphenyl) chromium iodide was precipitated from an acetone solution with diethyl ether. This gave orange-red, shiny crystals which decomposed at 158–162° C. A comparison of solubility, decomposition point, infra-red spectrum, and ultra-violet spectrum with that given by E. O. Fischer et al. (Ref. Chem. Ber. 89, 1809 (1956)) for bis(diphenyl) chromium iodide proves the identity of the two materials.

In the above example chromium trichloride was used, and the stoichiometry of the reaction required three moles of sodium adduct per mole of chloride to reduce the trivalent chromium in the chloride compound to neutral chromium in the bis(arene) compound. If chromium dichloride were used, only two moles of sodium adduct per mole of chloride would be required. Similarly, if a pentahalide such as tantalum pentachloride or a hexahalide such as tungsten hexachloride is used, the stoichiometry of the reaction requires, respectively, five and six moles of alkali metal adduct per mole of metal halide in order to obtain the best yield of product.

Another embodiment of the process of the present invention is illustrated by the following preparation of cyclopentadienyl manganese diphenyl.

A diphenyl sodium complex was prepared under an argon atmosphere, by the reaction of 23.1 grams (0.15 mole) of diphenyl in 250 milliliters of ethylene glycol dimethyl ether with 6.0 grams of a 50% dispersion of sodium in toluene.

Sodium cyclopentadienide was prepared in a separate flask by stirring 6.9 grams of a 50 wt. percent sodium dispersion in toluene (0.15 mole Na) in 250 milliliters of anhydrous ethylene glycol dimethyl ether and adding thereto 10.8 grams (0.17 mole) of cyclopentadiene. An argon atmosphere was maintained throughout. The temperature of the reaction mixture was held below 40° C. during the addition. White crystals of sodium cyclopentadienide were formed.

In a third flask, a milk-white suspension of manganous chloride in ethylene glycol dimethyl ether was prepared by stirring 18.9 grams (0.15 mole) of anhydrous manganous chloride in finely divided condition in 250 milliliters of ethylene glycol dimethyl ether at room temperature for one hour. The sodium cyclopentadienide was then added to the manganous chloride at room temperature with stirring. After about 15 minutes the reaction mixture containing cyclopentadienyl manganese chloride was cooled to −20° C. and the diphenyl sodium complex added slowly over a period of about 15 minutes. The reaction mixture was maintained below −10° C. for one hour, allowed to warm to room temperature and then filtered. The red-brown fiiltrate was evaporated to dryness at reduced pressure. The residue, when leached with n-heptane, gave a bright red-orange solution. The n-heptane solution was evaporated to dryness to yield red-orange crystals which were purified by fractional sublimation. Red crystals of (cyclopentadienyl)manganese(diphenyl) were obtained. Cyclopentadienyl(manganese(diphenyl) is a red solid, M.P. 73°–75° C., which distills at 80°–90° C. and a pressure of 0.04 mm. Hg. It is stable to air in heptane in the absence of light, but slowly decomposes in the presence of light.

The lithium and potassium adducts of arene hydrocarbons may be employed in reaction procedures similar to those described hereinabove.

Additional examples of compounds which can be prepared by the process of this invention are bis(p,p'-diethyldiphenyl) chromium, bis(p,p'-dimethyldiphenyl)molybdenum, bis(p-methyldiphenyl) tungsten, methylcyclopentadienyl manganese p-methyldiphenyl, ethylcyclopentadienyl manganese diphenyl, bis(diphenyl) vanadium and cyclopentadienyl rhenium diphenyl.

The compounds prepared by the process of this invention are useful for the deposition of metallic coatings and films on various substrates and as anti-knock additives for motor fuels.

Illustrative of the advantages of fuel compositions containing the (cyclopentadienyl)manganese (diphenyl) additives, it has been found, using from 0.25 to 0.50 gram of $(C_5H_5)Mn(C_{12}H_{10})$ per 400 milliliters of standard 60 octane fuel mixture (60 vol.-percent isooctane and 40 vol.-percent n-heptane) in an internal combustion engine, that the octane rating of the fuel mixture increased from 1.7 to 2.3 units.

The following table presents the results of adding 0.25 gram and 0.50 gram of (cyclopentadienyl)manganese(diphenyl) to 400 milliliters of a standard 60 octane ASTM fuel mixture. The tests were conducted according to ASTM research octane rating method D–908.

| Additive | | Resulting fuel octane number | |
|---|---|---|---|
| Gms./400 ml. | Gms./gal. | $(C_5H_5)Mn(C_{12}H_{10})$ | No additive |
| 0 | 0 | ---------- | 60 |
| 0.25 | 2.4 | 61.7 | ---------- |
| 0.50 | 4.7 | 62.3 | ---------- |

The maximum desirable concentration of the additive is about 30 grams per gallon.

Also, the bis arene metal compounds of this invention may be decomposed at temperatures in excess of 400° C.

Thus a metal coating may be deposited upon such materials as glass, glass cloth, resins or other insulating substrates which have desirable electrical properties, thus making the coated substrates useful as strip conductors and resistors for electrical purposes. In particular, approximately 0.5 gram of bis(diphenyl) chromium is sealed in an evacuated glass tube with a strip of glass cloth which has been previously dried in an oven at 150° C. for 1 hour, the tube is then heated to 400° C. for 1 hour, cooled and opened. The glass cloth will have increased in weight by as much as 0.01 gram per gram of glass cloth and will have a resistivity of approximately 2 ohms per centimeter. Thus, a conducting cloth may be prepared which is useful for the reduction of static charge, for decoration, for refractive thermo-insulation and to provide a heating element.

What is claimed is:

1. A process for the production of stable organometallic compounds containing at least one arene hydrocarbon group, which process comprises reacting at a temperature between about −80° C. and about 100° C. in an inert liquid organic ether solvent, said ether having no more than about four carbon atoms per oxygen atom in the molecule, and said ether when non-cyclic and aliphatic having at least one methoxy group in the molecule, (1) an anhydrous transition metal halide-containing compound selected from the class consisting of (a) metal halides consisting only of metals selected from the class consisting of vanadium, niobium, tantalum, chromium, molybdenum and tungsten, and halogens, and (b) monocyclopentadienyl metal halides consisting only of metals selected from the class consisting of manganese and rhenium, halogens, and a group selected from the class consisting of cyclopentadienyl and lower-alkyl-substituted clyclopentadienyl with (2) an alkali metal addition complex of an arene hydrocarbon, said arene hydrocarbon having the formula:

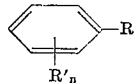

wherein R is a group selected from the class consisting of phenyl and lower alkyl-substituted phenyl, R' is a group selected from the class consisting of lower alkyl and phenyl, and the subscript $n$ is an integer selected from the group consisting of zero, 1 and 2.

2. Process in accordance with claim 1 wherein said alkali metal is lithium.

3. Process in accordance with claim 1 wherein said alkali metal is sodium.

4. Process in accordance with claim 1 wherein said alkali metal is potassium.

5. Process in accordance with claim 1 wherein said temperature is between about −20° C. and about 40° C.

6. Process for the production of bis(diphenyl) chromium which comprises reacting in a solvent selected from the class consisting of ethylene glycol dimethyl ether and tetrahydrofuran at a temperature between about −80° C. and about 100° C. (1) an alkali metal addition complex of diphenyl with (2) an anhydrous chromium halide consisting only of chromium and halogens.

7. Process in accordance with claim 6 wherein said alkali metal is sodium.

8. Process in accordance with claim 6 wherin said chromium halide is chromium trichloride.

9. Process for the production of cyclopentadienyl manganese diphenyl which comprises reacting in a solvent selected from the class consisting of ethylene glycol dimethyl ether and tetrahydrofuran at a temperature between about −80° C. and about 100° C. (1) an alkali metal addition complex of diphenyl with (2) a monocyclopentadienyl manganese halide consisting only of manganese, halogens and a cyclopentadienyl group, $C_5H_5$.

10. Process in accordance with claim 9 wherein said alkali metal is sodium and said mono-cyclopentadienyl manganese halide is cyclopentadienyl manganese chloride, $C_5H_5MnCl$.

11. Process for the production of a cyclopentadienyl manganese diphenyl which comprises reacting in a solvent selected from the class consisting of ethylene glycol dimethyl ether and tetrahydrofuran at a temperature between about −80° C. and about 100° C. (1) an alkali metal addition complex of diphenyl with (2) a mono-cyclopentadienyl manganese halide consisting only of manganese, halogens and a lower-alkyl-substituted cyclopentadienyl group.

12. Process in accordance with claim 11 wherein said alkali metal is sodium and said mono-cyclopentadienyl manganese halide is methylcyclopentadienyl manganese chloride, $CH_3C_5H_4MnCl$.

13. Process for the production of bis(diphenyl) chromium which comprises reacting in tetrahydrofuran at a temperature between about −20° C. and about 40° C. sodium addition complex of diphenyl with anhydrous chromium trichloride.

14. Process for the production of cyclopentadienyl manganese diphenyl which comprises reacting in ethylene glycol dimethyl ether at a temperature between about −20° C. and 40° C. sodium addition complex of diphenyl with cyclopentadienyl manganese chloride, $C_5H_5MnCl$.

References Cited in the file of this patent

UNITED STATES PATENTS

| | | |
|---|---|---|
| 2,019,832 | Scott | Nov. 5, 1935 |
| 2,839,552 | Shapiro | June 17, 1958 |
| 2,870,183 | Brantley | Jan. 20, 1959 |

OTHER REFERENCES

Lipkin et al.: Science, 117, 534–6 (1953).
Fischer et al.: Z. Naturforsch. 10b, 665–668 (1955).
Hein: Bericht Deut. Chem., 89, 1816–21, 1956.
Coffield et al.: J.A.C.S. 79, 5826 (1957).